Jan. 31, 1956    R. C. VORDERSTRASSE    2,732,866
WIRE MESH PULL UP
Filed Oct. 5, 1951
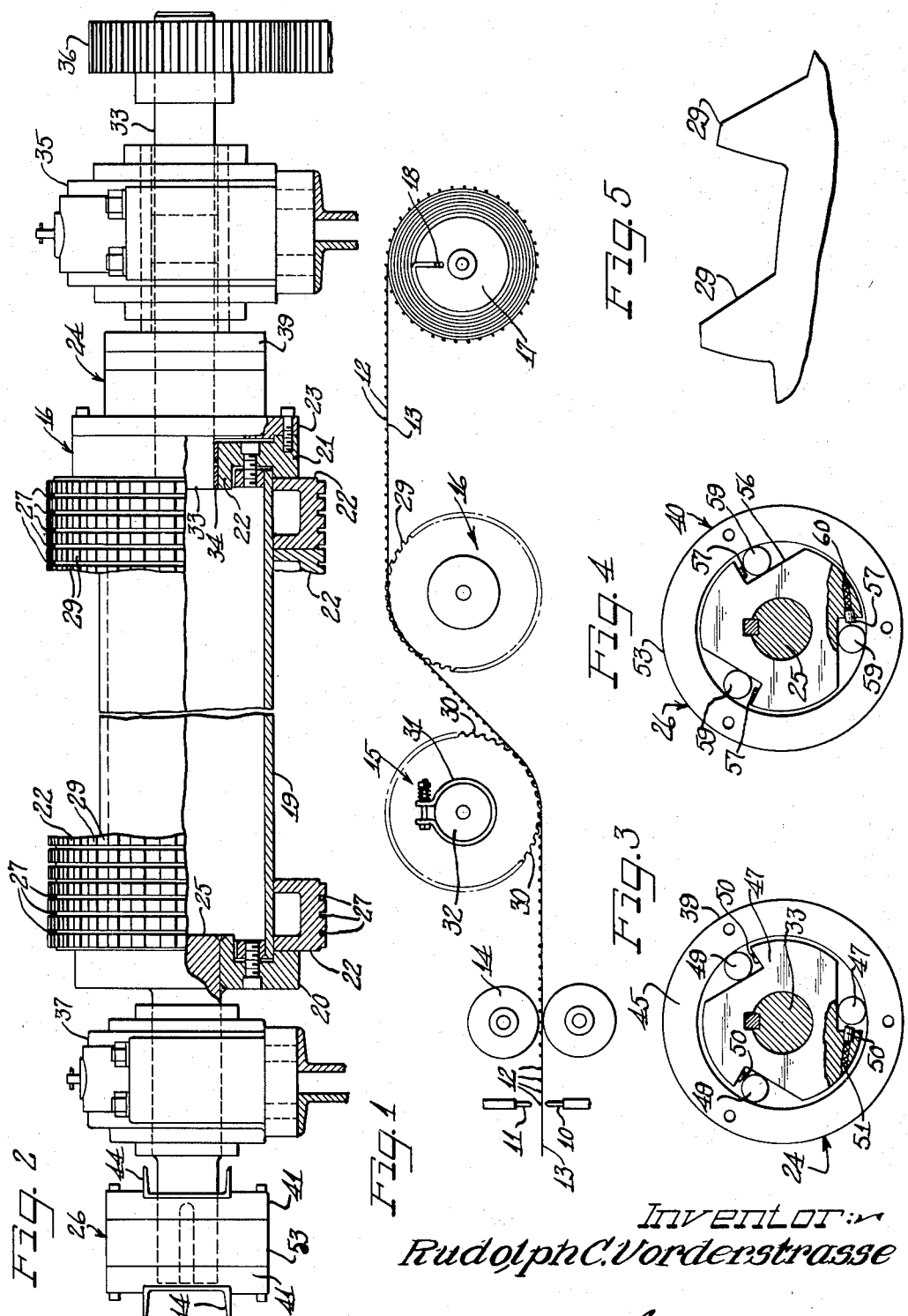
Inventor:
Rudolph C. Vorderstrasse
by Hill, Sherman, Meroni, Gross & Simpson Attys

United States Patent Office 2,732,866
Patented Jan. 31, 1956

2,732,866

WIRE MESH PULL UP

Rudolph C. Vorderstrasse, Sterling, Ill., assignor to Northwestern Steel and Wire Company, Sterling, Ill., a corporation of Illinois Application October 5, 1951, Serial No. 249,875

2 Claims. (Cl. 140—112)

This invention relates to improvements in pull ups for wire mesh fabricating machines and more particularly relates to a power driven rotating mechanism arranged to more accurately pull the wire from the welding electrodes of a fabricating machine for baling.

In the fabricating of welded wire mesh, the welded mesh is usually meshed with the teeth of an intermittently driven drum, driven by a pawl and ratchet drive and intermittently pulled thereby past the welding electrodes, and supplied to a coiling block for baling. With such types of machines, it is extremely difficult to obtain a uniform mesh due to irregularity of the feeding movement of the pull up drum and the tendency of said drum to slip back at the end of a period of intermittent rotation thereof, and the extreme difficulty in adjusting feed to the drum to accurately pull the mesh in timed relation with respect to the welding operation. This results in an irregular mesh, the wires of which are frequently distorted which is extremely objectionable. Also, the maximum diameter of the bale is limited by the maximum diameter of the drum and where the bale is much larger than the drum diameter, the mesh will tend to come out of mesh with the teeth of the drum, disrupting the entire operation.

A principal object of my invention is to overcome the foregoing difficulties by providing a novel and simplified form of pull up for wire mesh fabricating machines, for accurately pulling the mesh from the welding electrodes with no back slip.

Another object of my invention is to provide a simple and improved form of mechanism for intermittently pulling wire mesh from the welding electrodes of a wire mesh fabricating machine and supplying the mesh to a coiling block for baling, which is arranged with a view toward extreme accuracy in pulling the wire past the welding electrodes and ease in passing the wire from the pull up drum to a coiling block.

Another and more specific object of my invention is to provide a novel and improved form of pull up for wire mesh fabricating machines which may accurately supply the line wires to the welding electrodes, for welding of the cross wires thereto at speeds determined by the required size of the mesh.

Still another object of my invention is to provide an accurate pull up for wire mesh fabricating machines wherein the mesh is pulled by a toothed pull up drum and is placed under tension by a friction restrained toothed hold-back drum and wherein the pull up drum is driven and held from backward slipping movement by oppositely disposed over-running clutches.

A still further object of my invention is to provide cooperating holdback and pull up drums for a wire mesh fabricating machine having oppositely pitching teeth under and over which the wire mesh is passed on the respective drums, the teeth of each drum being arranged with a view toward ease of entry of the mesh to the holdback drum, maintaining tension on the mesh between the two drums, and ease of release of the mesh from the pull up drum.

A still further object of my invention is to provide a novel and improved feeding means for a wire mesh fabricating machine including parallel spaced holdback and pull up drums circumferentially slotted to receive the line wires and having teeth extending around the periphery thereof pitching in opposite directions on the respective drums for ease of entry of the wires to the holdback drum and ease of discharge of the wires from the pull up drum and enabling the coiling of larger diameter bales of wire than formerly.

These and other objects of my invention will appear from to time as the following specification proceeds and with reference to the accompanying drawing wherein:

Figure 1 is a diagrammatic view showing the welding electrodes of an intermittent type of wire mesh welding machine, with a pull up mechanism constructed in accordance with my invention arranged to pull the wire past the welding electrodes and to supply the mesh for baling;

Figure 2 is a view in side elevation of a pull up drum constructed in accordance with my invention with certain parts thereof broken away and certain other parts shown in vertical section;

Figure 3 is an end view of an overrunning clutch with the end cover thereof removed and illustrating the drive clutch for the pull up drum;

Figure 4 is an end view of an overrunning clutch with the end cover thereof removed and like the clutch shown in Figure 3 but showing the clutch reversed to operate in an opposite direction from that shown in Figure 3 and act as a back stop for the pull up drum; and Figure 5 is a detail view illustrating the tooth contour for the pull up and hold back drums and taken from the opposite end of the mechanism from Figure 1.

In Figure 1 of the drawings, I have illustrated diagrammatically stationary and movable electrodes 10 and 11, respectively, of a wire mesh welding machine which may weld stay or cross wires 12 to parallel spaced line wires 13.

The wire mesh welding machine to which my invention may be applied may be of a type like that manufactured by "Rex Welder & Engineering Company" of Kansas City, Missouri, and not herein shown or described since the machine itself is well known to those skilled in the art and constitutes no part of my present invention.

As will be understood by those skilled in the art, the line wires 13, 13 are trained from a plurality of spools (not shown) through the machine between the fixed and movable welding electrodes 10 and 11 respectively. Immediately to the rear of the welding electrodes 11, 11 is provided a feeding mechanism (not shown) for the cross wires 12, 12, for successively feeding cross wires of proper length to the line wires at a position immediately beneath the movable electrodes 11 where the respective cross wire is welded thereto by said electrodes, movement of the line wires 13, 13 stopping during the welding operation.

After the welding of each successive cross wire to the parallel spaced line wires is accomplished, the welded mesh may pass between slitting knives 14, 14, which may serve to trim and slit the mesh to the required width. From said slitting knives the mesh is shown as passing under a holdback drum 15 frictionally restrained from rotation and over a pull up drum 16 intermittently driven, to intermittently advance the line wires the necessary distance to position the line wires for welding the cross wires thereto in the required spaced relation, by the welding electrodes 10 and 11.

From the pull up drum, the slit mesh may pass to a baler consisting of a baling block 17 shown as having a radial slot 18 therein, to receive an inturned end of the mesh and bale or coil the mesh thereon. Said baling block may be of any well known form and may be of a type which is expanded during the baling or coiling operation and contracted at the end of the operation, to enable ready removal of the mesh therefrom.

Referring now in particular to Figure 2, illustrating in detail the pull up drum 16, said pull up drum comprises generally a hollow drum or cylinder 19. The cylinder 19 is shown as having end plates 20 and 21 secured to the ends thereof and extending radially outwardly therefrom. Said end plates overlap the ends of said drum and clamp annular toothed sections 22, 22 to said drum. The end plate 21 is shown as having a flange 23 of an overrunning clutch 24 secured thereto and serves as a drive member for said drum. The end plate 20 is shown as having a shaft 25 secured thereto and extending therefrom and connected with an overrunning clutch 26, arranged oppositely from the clutch 24 and serving to hold said drum from rotation in a direction opposite from the direction in which it is driven by the clutch 24.

Each toothed section 22 is shown as being of an annular form U-shaped in cross section and as having a plurality of equally spaced circumferential slots 27, 27 extending therearound, to receive the line wires 13, 13. Said toothed sections likewise have a plurality of equally spaced aligned teeth 29, 29 extending thereacross, for engaging the cross wires between the line wires and advancing the line wires for welding and also for pulling the welded mesh from the welding electrodes 10 and 11 to the block 17 for baling.

The teeth 29, 29 are shown in Figures 1 and 5 as being inclined or pitched in the direction of rotation of the pull up drum 16 to readily mesh with the cross or stay wires 13, 13 as they pass from the hold back drum 15, and to assure that said cross wires will freely leave said teeth, as the mesh is baled. This inclination of the teeth will hereinafter be referred to as pitching of the teeth.

The hold back drum 15 is likewise provided with circumferential slots for the line wires and has teeth 30, 30 formed like the teeth 29, 29 but pitched in a direction opposite from the direction of pitch of the teeth 29, 29. The teeth 30, 30 are like the teeth 29, 29, but are pitched in an opposite direction from said teeth and are so formed as to readily receive the cross wires 13, 13 and react thereagainst and hold said cross wires in mesh with the oppositely pitching teeth of the pull up drum, and to freely leave said hold back drum.

The hold back drum 15 may be journaled on the machine frame in a suitable manner and is diagrammatically shown as being restrained from rotation by means of a friction band 31 which may be of any well known form and may engage a brake drum 32 on said hold back drum, to restrain rotation thereof in a counter-clockwise direction, and cause said drum to react against the mesh and hold the mesh in tension between the hold back and pull up drums and also maintain the mesh in engagement with the teeth 29, 29 of the pull up drum.

Referring now to the drive to the pull up drum 19, the end plate 21 is shown as being journaled on a transverse shaft 33 as by a bearing 34. Said shaft in turn is shown as being journaled in a suitable bearing means such as a pillow block 35, mounted on the machine frame. Suitable means may be provided to intermittently drive the shaft 33 from the drive mechanism for the welding machine in synchronism with the operation thereof, which may include a gear train 36 and an intermittent drive mechanism therefor (not shown), which may be of any well known form and is not herein shown or described, since it forms no part of my invention.

The transverse shaft 25 is shown as being journaled in a suitable bearing means such as a pillow block 37 mounted on the machine frame and as being keyed to the overrunning clutch 26. The clutch 26 is mounted on parallel spaced channels 44, 44 of the machine frame, on its outer casing, and its outer casing is held from rotation by said channels.

The overrunning clutch 24 is shown as being mounted on the transverse shaft 33 and driven therefrom, for driving the pull up drum 16 from said shaft through the flange 23.

Referring now to Figures 3 and 4, diagrammatically illustrating the overrunning clutches 24 and 26, said clutches are each of a similar construction, except the clutch 24 acts as a one-way drive clutch while the clutch 26 is arranged in an opposite direction from the clutch 24 and acts as a one-way back stop. The overrunning clutch 24 consists generally of an outer member 45 having a circular race and an inner member or many sided cam 47, keyed to the shaft 33 and driven therefrom. A roller 49 is shown as being movable along each cam face of the inner member 47 and as being held in operative position by a plunger 50 pressed by a light spring 51, to engage said roller immediately at the start of a driving action, and wedge the roller between the race and cam. Thus, the instant the shaft 33 starts to rotate in a clockwise direction, the rollers 49, 49 will be wedged with the race of the member 45 and provide an instantaneous drive connection to the outer race 45, with no lost motion, driving said outer race in the same direction as the direction of rotation of the shaft 33. This clutch, therefore, provides a drive from the shaft 33 to the drum 16 through the flange 23, instantaneously picking up the load and driving said drum the instant said shaft starts to rotate, with no back lash or lost motion and enables length of feed of the line wires between each welding operation to be accurately maintained within a few thousandths of an inch.

As has been mentioned before, the overrunning clutch 26 is exactly like the overrunning clutch 24, but is oppositely arranged and an outer member 53 thereof is held from rotation. Said clutch 26 is provided with a many faced cam 55, shown as being keyed to the shaft 25, the cam surfaces of which face in an opposite direction from the cam surfaces of the many faced cam 47. Said many faced cam is likewise provided with plungers 57, 57 pressed into engagement with drive rollers 59, 59 by light springs 60, 60. With this form of clutch, upon rotation of the shaft 38 in a clockwise direction, which is the direction of rotation of the pull up drum 16, when pulling up the mesh from the welding electrodes, the rollers will rotate against the plungers 57, 57, depressing said plungers and allowing free rotation of the many faced cam 55 with respect to the outer race 53. The instant, however, rotation of the pull up drum 16 stops, the plungers 57, 57 will move the rollers into an operative position wedging them between the cams 56, 56 and the inner periphery of the outer race 47, and positively holding the pull up drum 16 from rotation in a direction to slacken the wire mesh between the hold back drum 15 and pull up drum 16, it being understood that when rotation of the shaft 33 is stopped, the overrunning clutch 45 will also positively hold the pull up drum 16 from rotation in a pull up direction.

An accurate drive instantaneously picking up the mesh has been provided for the pull up drum 16, with no back lash either when initially rotating said drum or when rotation thereof has been instantaneously stopped during the welding operation, which may be accommodated to the size of the mesh being welded and uniformly pull the mesh from the welding electrodes 10 and 11 by engagement of the teeth of the drum with each cross wire, throughout the entire width of the mesh, resulting in a more accurate final product than has heretofore been considered possible.

It may also be seen that the hold back drum 15 being rotated in a counter-clockwise direction by the mesh engaging the teeth thereof and being restrained from rotation by the friction brake 31 maintains the stay or cross wires in engagement with the teeth 29, 29 of the pull up drum 16 and maintains the mesh under tension between said hold back and pull up drums, assuring a uniform tension of the mesh and also preventing the mesh from coming out of engagement with the teeth 29, 29, in cases where the mesh coiled on the blocker 17 may be abnormally large.

It may further be seen that the teeth 31, 31 are arranged to readily receive the cross wires and also hold the cross wires in engagement with the oppositely pitching teeth 29, 29 on the pull up drum, and that the teeth 29, 29 pitching in the direction of rotation of the pull up drum 16 are so arranged as to readily free the cross wires therefrom and to assure that the cross wires react thereagainst until said cross wires positively pass therefrom toward the blocker 17.

It will be understood that various modifications and variations may be effected without departing from the spirit and scope of the novel concepts of the present invention.

I claim as my invention:

1. A wire pull up for wire mesh welding machines for uniformly tensioning and pulling up welded wire mesh from the welding electrodes therefor comprising two aligned drums rotatable about parallel axes, one being spaced in advance of the other, the peripheries of said drums being circumferentially slotted to receive the line wires of the mesh and said drums being transversely slotted to receive the cross wires of the mesh, friction means restraining one of said drums from rotation, power means for intermittently driving the other of said drums in a pull up direction only including an overrunning clutch, a second overrunning clutch holding said drum from back slipping movement, and the transverse slots on the faces of said drums being in the form of gear teeth, the teeth on said hold back drum pitching in a direction opposite to its direction of rotation, and the teeth on said pull up drum pitching in the direction of rotation thereof, to maintain the cross wires in positive engagement with the teeth on said pull up drum and allowing said cross wires to freely pass from said pull up drum, for baling.

2. In a pull up for uniformly tensioning welded wire mesh and intermittently pulling the same past the welding electrodes therefor and supplying the same for baling, a pull up drum having a plurality of circumferential slots for line wires and a plurality of transversely extending teeth for engagement with the cross wires, said teeth being pitched in the direction of rotation of said pull up drum, intermittent drive means for driving said drum in a pull up direction and including an intermittently driven shaft, an overrunning clutch on said shaft and driven therefrom, a second overrunning clutch for holding said drum from rotation in a direction opposite to a pull up direction, a hold back drum on the incoming side of said pull up drum having circumferential line wire receiving slots therein and transverse cross wire engaging teeth therein pitched in a direction opposite to the direction of rotation of said drum, and friction means restraining said hold back drum from rotation and maintaining the mesh in engagement with said pull up drum under tension.

References Cited in the file of this patent

UNITED STATES PATENTS

| | | |
|---|---|---|
| 633,213 | Perry | Sept. 19, 1899 |
| 828,772 | Patterson | Aug. 14, 1906 |
| 1,249,016 | Brogdon | Dec. 4, 1917 |
| 1,367,212 | Southwick | Feb. 1, 1921 |
| 1,554,030 | Reed | Sept. 15, 1925 |
| 2,001,597 | Caps et al. | May 14, 1935 |